(12) United States Patent
Olson et al.

(10) Patent No.: US 12,685,956 B2
(45) Date of Patent: Jul. 21, 2026

(54) PULSE AIR CLEANER SYSTEM WITH PULSE TUBE EXTENSION

(71) Applicant: Donaldson Company, Inc., Minneapolis, MN (US)

(72) Inventors: Thomas R. Olson, Prior Lake, MN (US); Timothy D. Sporre, Brooklyn Park, MN (US); Randall A. Engelland, Farmington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 713 days.

(21) Appl. No.: 17/609,274

(22) PCT Filed: May 7, 2020

(86) PCT No.: PCT/US2020/031764
§ 371 (c)(1),
(2) Date: Nov. 5, 2021

(87) PCT Pub. No.: WO2020/227464
PCT Pub. Date: Nov. 12, 2020

(65) Prior Publication Data
US 2022/0226764 A1 Jul. 21, 2022

Related U.S. Application Data

(60) Provisional application No. 62/845,151, filed on May 8, 2019.

(51) Int. Cl.
*B01D 46/71* (2022.01)
*B01D 46/00* (2022.01)
*B01D 46/24* (2006.01)

(52) U.S. Cl.
CPC ......... B01D 46/71 (2022.01); B01D 46/0002 (2013.01); B01D 46/2411 (2013.01); *B01D 2265/028* (2013.01)

(58) Field of Classification Search
CPC ................ B01D 46/71; B01D 46/0002; B01D 46/2411; B01D 2265/028; B01D 35/30;
(Continued)

(56) References Cited

U.S. PATENT DOCUMENTS

| 4,826,512 A | 5/1989 | Fuller |
| 5,575,826 A | 11/1996 | Gillingham et al. |

(Continued)

FOREIGN PATENT DOCUMENTS

| CN | 108722060 A | * 11/2018 | ......... B01D 46/0004 |
| DE | 39 36 837 | 4/1991 | |

(Continued)

OTHER PUBLICATIONS

International Application No. PCT/US2020/031764 filed May 7, 2020, International Preliminary Report on Patentability issued Nov. 2, 2021, 7 pages.
(Continued)

*Primary Examiner* — Qianping He
(74) *Attorney, Agent, or Firm* — Mueting Raasch Group

(57) ABSTRACT

An assembly and system of an air cleaner for a vehicle is described herein. The air cleaner assembly and systems include a filter cartridge extending along a longitudinal axis between a first filter end and a second filter end. The filter cartridge includes filter media configured to filter air passing through the filter media. The filter cartridge includes a cartridge passage defined by an inner filter surface of the filter cartridge. The air cleaner assembly and systems also include a pulse tube extension coupled to the filter cartridge and extending into the cartridge passage along the longitudinal axis such that an outer tube surface of the pulse tube extension faces the inner filter surface of the filter cartridge. The pulse tube extension defines a tube passage located within the cartridge passage.

32 Claims, 8 Drawing Sheets

(58) Field of Classification Search
CPC .......... B01D 2201/305; B01D 46/0004; B01D 46/0005; B01D 2201/4084; B01D 2201/4046; B01D 46/2414; B01D 2201/208; B01D 46/4281; B01D 47/10; B01D 47/06; B01D 2321/04; B01D 2201/291; B01D 46/24; B01D 46/00; B01D 46/04
USPC ............................................. 55/302; 95/280
See application file for complete search history.

(56) References Cited

U.S. PATENT DOCUMENTS

| | | | |
|---|---|---|---|
| 5,683,479 | A | 11/1997 | Gillingham et al. |
| 6,676,721 | B1 | 1/2004 | Gillingham et al. |
| 6,872,237 | B2 | 3/2005 | Gillingham et al. |
| 6,908,494 | B2 | 6/2005 | Gillingham et al. |
| 7,090,711 | B2 | 8/2006 | Gillingham et al. |
| 7,927,396 | B2 | 4/2011 | Olson et al. |
| 8,262,762 | B2 | 9/2012 | Olson et al. |
| 8,382,870 | B2 | 2/2013 | Troxell et al. |
| 8,404,021 | B2 | 3/2013 | Gillingham et al. |
| 8,444,748 | B2 | 5/2013 | Gillingham et al. |
| 9,108,135 | B2 | 8/2015 | Gillingham et al. |
| 9,186,612 | B2 | 11/2015 | Wahlquist et al. |
| 9,737,837 | B2 | 8/2017 | Wahlquist et al. |
| 9,757,673 | B2 | 9/2017 | Gillingham et al. |
| 10,512,870 | B2 | 12/2019 | Gillingham et al. |
| 10,675,578 | B2 | 6/2020 | Wahlquist et al. |
| 10,967,320 | B2 | 4/2021 | Gillingham et al. |
| 2002/0030006 | A1* | 3/2002 | Beck ...................... B01D 29/15 |
| 2002/0046656 | A1* | 4/2002 | Benson .............. B01D 39/1623 55/486 |
| 2004/0055470 | A1 | 3/2004 | Strauser et al. |
| 2008/0053243 | A1* | 3/2008 | Kimball ................ G01F 15/006 73/861.63 |
| 2009/0183472 | A1 | 7/2009 | Amano et al. |
| 2011/0185893 | A1 | 8/2011 | Olson et al. |
| 2011/0252964 | A1 | 10/2011 | Wahlquist et al. |
| 2016/0166967 | A1 | 6/2016 | Wahlquist et al. |
| 2017/0341000 | A1 | 11/2017 | Wahlquist et al. |
| 2017/0368489 | A1 | 12/2017 | Gillingham et al. |
| 2018/0161707 | A1* | 6/2018 | Roesgen ................ F02M 37/42 |
| 2018/0339253 | A1* | 11/2018 | Karlsson ............ B01D 46/0005 |
| 2019/0134549 | A1* | 5/2019 | Klein ................ B01D 46/0046 |
| 2020/0230538 | A1 | 7/2020 | Gillingham et al. |
| 2020/0398206 | A1 | 12/2020 | Wahlquist et al. |

FOREIGN PATENT DOCUMENTS

| | | |
|---|---|---|
| DE | 100 10 507 | 9/2001 |
| DE | 10 2008 063 720 | 6/2010 |
| DE | 10 2015 005 414 | 11/2016 |
| DE | 10 2016 007 789 | 12/2017 |
| WO | 2007/149388 | 12/2007 |
| WO | 2009/117579 | 9/2009 |
| WO | 2011/102934 | 8/2011 |

OTHER PUBLICATIONS

International Application No. PCT/US2020/031764 filed May 7, 2020, International Search Report and Written Opinion issued Jul. 7, 2020, 10 pages.

* cited by examiner

10

12

14

PULSE AIR CLEANER SYSTEM WITH PULSE TUBE EXTENSION

This application is the §371 U.S. National Stage of International Application No. PCT/US2020/031764, filed 7 May 2020, which claims the benefit under 35 U.S.C. § 119 of U.S. Provisional Application No. 62/845,151 filed 8 May 2019, the disclosure of each of which is incorporated by reference herein in its entirety.

The disclosure herein relates generally to air cleaner assemblies and systems for use with, for example, vehicles and other equipment. Specifically, air cleaner systems that include pulse jet cleaning arrangements for cleaning air filter media and pulse tube extensions to assist in dispersing gas from a pulse jet apparatus of the pulse jet cleaning arrangements.

SUMMARY

Air cleaner assemblies and systems for vehicles and related methods are described herein. In one or more embodiments, the air cleaner assemblies and systems include a pulse tube extension coupled to a filter cartridge located within an air cleaner housing.

Pulse tube extensions may be useful to disperse a cleaning pulse of gas (e.g., air) delivered to the interior of a filter cartridge to remove particulate matter collected on the exterior of the filter cartridge to restore the ability of filter cartridge to clean dirty air delivered into the air cleaner assembly. In the absence of a pulse tube extender, the cleaning pulse may be less effective at removing particulate matter from portions of the filter cartridge, e.g., portions located farther away from the cartridge opening (i.e., the opening through which clean air exits the filter cartridge).

In one or more embodiments, the pulse cleaning benefits may be particularly pronounced when the pulse tube extension extends within the filter cartridge for at least 40% of the cartridge length at a lower end and/or 90% or less of the cartridge length at an upper end.

In one or more embodiments, the pulse cleaning benefits may be particularly pronounced when a gap distance measured between the pulse tube extension and an inner filter surface of the filter cartridge in which the pulse tube extension is located is controlled. In one or more embodiments, the gap distance may be at least 0.6 centimeters at a lower end and/or 2.5 centimeters or less at an upper end.

In one or more embodiments, the pulse tube extension may be coupled to the filter cartridge such that the pulse tube extension is inserted into and removed from the air cleaner housing with the filter cartridge. Therefore, the pulse tube extension does not limit or prevent specific directional movement of the filter cartridge (e.g., when inserting into or removing from the air cleaner housing) and may, for example, be more easily used in existing air cleaner housings without requiring enlargement, modification, etc. of the air cleaner housing. As such, the filter cartridge can be inserted into or removed from the air cleaner housing in a direction that is at an angle to a longitudinal axis along which the filter cartridge extends.

An illustrative air cleaner assembly may include a filter cartridge and a pulse tube extension. The filter cartridge may extend along a longitudinal axis between a first filter end and a second filter end, the filter cartridge comprising filter media configured to filter air passing through the filter media. The filter cartridge may define a cartridge opening at the first filter end and a cartridge passage extending within the filter cartridge from the cartridge opening. The cartridge passage may be defined by an inner filter surface of the filter cartridge. The pulse tube extension may include a tube sidewall extending between a first tube end and a second tube end. The pulse tube extension may be coupled to the filter cartridge and may extend into the cartridge passage along the longitudinal axis such that an outer tube surface of the pulse tube extension faces the inner filter surface of the filter cartridge. The pulse tube extension may define a tube passage located within the cartridge passage.

In one or more embodiments of the air cleaner assembly as described herein, the pulse tube extension extends past the first filter end by less than 6 centimeters.

In one or more embodiments of the air cleaner assembly as described herein, the first tube end is fixedly coupled to the first filter end of the filter cartridge and extends into the cartridge passage towards the second filter end of the filter cartridge.

In one or more embodiments of the air cleaner assembly as described herein, the pulse tube extension directly contacts the first filter end of the filter cartridge.

In one or more embodiments of the air cleaner assembly as described herein, the pulse tube extension comprises a tube flange portion at the first tube end, wherein an inner surface of the tube flange portion directly contacts the first filter end of the filter cartridge.

In one or more embodiments of the air cleaner assembly as described herein, the tube sidewall of the pulse tube extension is configured to control passage of gas such that a majority of gas entering the tube passage of the pulse tube extension through the first tube end exits the tube passage through the second tube end.

In one or more embodiments of the air cleaner assembly as described herein, the filter cartridge defines a cartridge length between the first filter end and the second filter end measured along the longitudinal axis, wherein the pulse tube extension extends within the filter cartridge for at least 40% of the cartridge length.

In one or more embodiments of the air cleaner assembly as described herein, the tube sidewall is concentric to the inner filter surface of the filter cartridge for a length measured along the longitudinal axis.

In one or more embodiments of the air cleaner assembly as described herein, at least a portion of the tube sidewall is spaced a gap distance away from the filter media, wherein the gap distance is measured between the inner filter surface and the outer tube surface of the pulse tube extension, and wherein the gap distance is at least 0.6 centimeters.

In one or more embodiments of the air cleaner assembly as described herein, the pulse tube extension includes a tube flange portion at the first tube end, a tube contact portion adjacent the tube flange portion and in contact with the inner filter surface of the filter cartridge, and a tube extended portion at the second tube end.

In one or more embodiments of the air cleaner assembly as described herein, the pulse tube extension further comprises a tube tapered portion extending between the tube contact portion and the tube extended portion.

In one or more embodiments of the air cleaner assembly as described herein, the tube contact portion is configured to center the pulse tube extension within the cartridge passage.

In one or more embodiments of the air cleaner assembly as described herein, the pulse tube extension comprises at least one of steel, aluminum, plastic, etc.

In one or more embodiments of the air cleaner assembly as described herein, the pulse tube extension is fixedly coupled to the filter cartridge via adhesive.

In one or more embodiments of the air cleaner assembly as described herein, the pulse tube extension defines an annular cross-section.

An illustrative air cleaner system may include an air cleaner housing, a filter cartridge, and a pulse tube extension. An air cleaner housing may include an air flow inlet and an air flow outlet. The air cleaner housing may include an outer housing sidewall and a filter cartridge recess located within the outer housing sidewall between the air flow inlet and the air flow outlet. The filter cartridge may be located within the filter cartridge recess. The filter cartridge may extend along a longitudinal axis between a first filter end and a second filter end and may include filter media configured to filter air passing through the filter media. Air entering the air cleaner housing through the air flow inlet may pass through the filter media before passing out of the air cleaner housing through the air flow outlet. The pulse tube extension may be coupled to the filter cartridge and may extend into the filter cartridge such that an outer tube surface of the pulse tube extension faces the filter cartridge. The filter cartridge and the pulse tube extension may be configured to be inserted into and removed from the filter cartridge recess of the air cleaner housing in a direction at least partially transverse to the longitudinal axis. In one or more embodiments of the air cleaner system as described herein, the pulse tube extension is fixedly coupled to the filter cartridge.

In one or more embodiments of the air cleaner system as described herein, the outer housing sidewall defines a housing opening configured to allow passage of the filter cartridge and pulse tube extension therethrough, and wherein the air cleaner housing further comprises a housing access panel movably coupled to the outer housing sidewall and configured to move between an open configuration and a closed configuration, wherein the housing opening is sealed when the housing access panel is in the closed configuration.

In one or more embodiments of the air cleaner system as described herein, the outer housing sidewall defines a housing opening configured to allow passage of the filter cartridge and pulse tube extension therethrough, and wherein the outer housing sidewall defines a housing length between a first housing end and a second housing end measured along a longitudinal axis, wherein the housing opening extends along the longitudinal axis 40% to 90% of the housing length.

In one or more embodiments of the air cleaner system as described herein, the outer housing sidewall extends between a first housing end and a second housing end along a longitudinal axis, wherein the air cleaner housing comprises a first housing end cap proximate the first housing end and a second housing end cap proximate the second housing end, wherein the first and second housing end caps are fixedly coupled to the outer housing sidewall.

In one or more embodiments of the air cleaner system as described herein, the filter cartridge is configured to be positioned within the filter cartridge recess of the air cleaner housing such that the filter cartridge axially seals with the air cleaner housing at the first and second filter ends.

In one or more embodiments of the air cleaner system as described herein, the air cleaner housing further comprises a latch configured to secure the filter cartridge into position within the filter cartridge recess of the air cleaner housing.

In one or more embodiments of the air cleaner system as described herein, the air cleaner housing further comprises a recess/protrusion configured to locate the filter cartridge relative to the air cleaner housing when the filter cartridge is positioned within the filter cartridge recess.

Another illustrative air cleaner system may include an air cleaner housing, a filter cartridge, a pulse tube extension, and a pulse cleaning apparatus. The air cleaner housing may include an air flow inlet and an air flow outlet. The air cleaner housing may include an outer housing sidewall and filter cartridge recess located within the outer housing sidewall between the air flow inlet and the air flow outlet. The filter cartridge may extend along a longitudinal axis between a first filter end and a second filter end. The filter cartridge may be positioned within the filter cartridge recess of the air cleaner housing. The filter cartridge may include filter media configured to filter air passing from the air flow inlet to the air flow outlet. The filter media may define a clean air space in fluid communication with the air flow outlet. The pulse tube extension may be coupled to the filter cartridge and may extend into the filter cartridge such that an outer tube surface of the pulse tube extension faces the filter cartridge. The filter cartridge and the pulse tube extension may be configured to be removable from the filter cartridge recess. The pulse cleaning apparatus may be positioned between the filter media and the air flow outlet. The pulse cleaning apparatus may be configured to direct gas through the clean air space and towards the filter media.

In one or more embodiments of the air cleaner system as described herein, a discharge outlet of the pulse cleaning apparatus is positioned proximate the first filter end.

In one or more embodiments of the air cleaner system as described herein, a discharge outlet of the pulse cleaning apparatus is positioned beyond the first tube end and the first filter end.

In one or more embodiments of the air cleaner system as described herein, the outer housing sidewall defines a housing opening configured to allow passage of the filter cartridge and pulse tube extension therethrough.

In one or more embodiments of the air cleaner system as described herein, the air cleaner housing further comprises a housing access panel movably coupled to the outer housing sidewall and configured to move between an open configuration and a closed configuration, wherein the housing opening is sealed when the housing access panel is in the closed configuration.

In one or more embodiments of the air cleaner system as described herein, the outer housing sidewall defines a housing length between a first housing end and a second housing end measured along a longitudinal axis, wherein the housing opening extends along the longitudinal axis about 50% to 90% of the housing length.

In one or more embodiments of the air cleaner system as described herein, the outer housing sidewall extends between a first housing end and a second housing end along a longitudinal axis, wherein the air cleaner housing comprises a first housing end cap proximate the first housing end and a second housing end cap proximate the second housing end, wherein the first and second housing end caps are fixedly coupled to the outer housing sidewall.

In one or more embodiments of the air cleaner system as described herein, the filter cartridge is configured to be positioned within the filter cartridge recess of the air cleaner housing such that the filter cartridge axially seals with the air cleaner housing at the first and second filter ends.

In one or more embodiments of the air cleaner system as described herein, the air cleaner housing further comprises a latch configured to secure the filter cartridge into position within the filter cartridge recess of the air cleaner housing.

In one or more embodiments of the air cleaner system as described herein, the air cleaner housing further comprises a recess/protrusion configured to locate the filter cartridge relative to the air cleaner housing when the filter cartridge is positioned within the filter cartridge recess.

In one or more embodiments of the air cleaner system as described herein, the pulse tube extension is fixedly coupled to the filter cartridge.

One or more embodiments of a method of replacing a filter cartridge in an air cleaner system as described herein may include: removing the filter cartridge and the pulse tube extension from the air cleaner housing; and inserting a second filter cartridge into the air cleaner housing after removing the filter cartridge and the pulse tube extension from the air cleaner housing, wherein the second filter cartridge contains, before being inserted into the air cleaner housing, one of a new pulse tube extension or the pulse tube extension located in the filter cartridge removed from the air cleaner housing.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
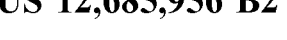
FIG. 1 is a perspective view of one illustrative embodiment of a vehicle incorporating an air cleaner assembly or system as described herein.

In the following description of illustrative embodiments, reference is made to the accompanying figures of the drawing, which form a part hereof, and in which are shown, by way of illustration, specific embodiments. It is to be understood that other embodiments may be utilized and structural changes may be made without departing from the scope of the present invention.

The disclosure herein includes illustrative embodiments of systems, apparatus, structures, and methods for an air cleaner system including a pulse tube extension coupled to a filter cartridge. The system may also include a pulse cleaning apparatus (e.g., a pulse jet cleaner) that may be configured to move debris and sediment off of filter media (e.g., an exterior surface of the filter media) within the air cleaner housing. For example, the pulse cleaning apparatus may, in one or more embodiments, carry out a pulse cleaning operation that may selectively clean a dirty filter without manual user interaction (e.g., without the user physically cleaning the filter). The pulse cleaning operation may be configured for manual or automatic activation (e.g., an operator may actuate or start the cleaning operation through wired or wireless electronics; or the cleaning operation may begin automatically based on a state or cleanliness of the filter). The pulse cleaning apparatus may, in one or more embodiments, be configured to produce a pulse of air within a clean air space to force debris and sediment from an exterior surface of the filter media in an effort to clean the filter. The pulse of air may be a high-pressure concentration of air that produces a force on the filter media such that the debris and sediment detaches from the filter media.

Further, the pulse tube extension may work in conjunction with the pulse cleaning apparatus. For example, in one or more embodiments, the pulse tube extension may be positioned within the filter cartridge such that gas or air from the pulse cleaning apparatus is dispersed evenly (e.g., producing a laminar flow) within the pulse tube extension before encountering the filter media of the filter cartridge. In other words, the pulse tube extension may, in one or more embodiments, be sized to correspond with the pulse jet cleaner to improve pulse cleaning of the filter cartridge as described herein. Pulse cleaning may be improved by, e.g., achieving laminar flow of air pulsed from the pulse cleaning apparatus within the pulse tube extension.

As described herein, the filter cartridge and pulse tube extension may be combined to simplify insertion into and/or removal from an air cleaner housing. Often, the pulse tube extension is fixedly coupled or integral with a body of the air cleaner housing and, therefore, the filter cartridge may only be inserted into and removed from the air cleaner housing in a specific direction to accommodate the pulse tube extension (e.g., axially loaded along the longitudinal axis of the pulse tube extension and the filter cartridge). In other words, in such configurations, the filter cartridge may slide over the pulse tube extension in one specific way, limiting the direction along which the filter cartridge may be inserted into and removed from the air cleaner housing. As such, by attaching the pulse tube extension to the filter cartridge, as described herein, the pulse tube extension may not limit movement of the filter cartridge (e.g., because it is attached to the filter cartridge) and the filter cartridge may be inserted into and removed from the air cleaner housing in any direction. Specifically, the filter cartridge may be inserted into and removed from the air cleaner housing in a direction that is at an angle to the longitudinal axis along which the filter cartridge extends. In one or more embodiments, the filter cartridge may be inserted into and/or removed from the air cleaner housing in one or more directions transverse to the longitudinal axis.

One illustrative embodiment of an air cleaner system within a vehicle 10 is depicted in FIG. 1. Specifically, FIG. 1 illustrates an M1 tank, however, the air cleaner system described herein may be applied to air cleaner systems of a variety of vehicles and/or equipment. For example, the air cleaner system may be implemented within armored vehicles, tracked personnel carriers, wheeled vehicles, mobile generators, stationary generators, etc.

The illustrative vehicle 10 may include an inlet 12 configured to allow the flow of air from the exterior environment, through filter media, and towards the engine intake. The inlet 12 may be located at any suitable location on the vehicle 10. Further, the vehicle 10 may include an outlet 14 configured as a passageway for detached particulate matter (e.g., debris, dust, sediment, etc.) to exit the air cleaner assembly after being pulsed from the filter media. The outlet 14 may be located at any suitable location on the vehicle 10. For example, the outlet 14 may disperse particulate matter into a general exhaust of the vehicle 10.

The process of cleaning the air cleaner system of the vehicle 10 by accessing and manually cleaning the filter may be complicated by many different factors. For example, the vehicle 10 may include numerous armored portions that may need to be removed or opened in order to access the pertinent components of the air cleaner system. Further, any removal of armored portions of the vehicle or accessing the air cleaner system may require immobilizing the vehicle 10 and, therefore, pulling the vehicle out of service for a duration of time. Further yet, the engine may be extremely hot from operation, which may create a dangerous situation in accessing the air cleaner system or necessitate even more down time for cooling. A number of other complications may arise from the process of manually attending to the air cleaner system. As such, the air cleaner system, as described herein, may provide for hands-off solutions to maintaining a clean filter system. For example, the pulse cleaner apparatus may help to further automate the cleaning process to ensure an efficient and effective way to maintain a clean filter.

Figure 2A:
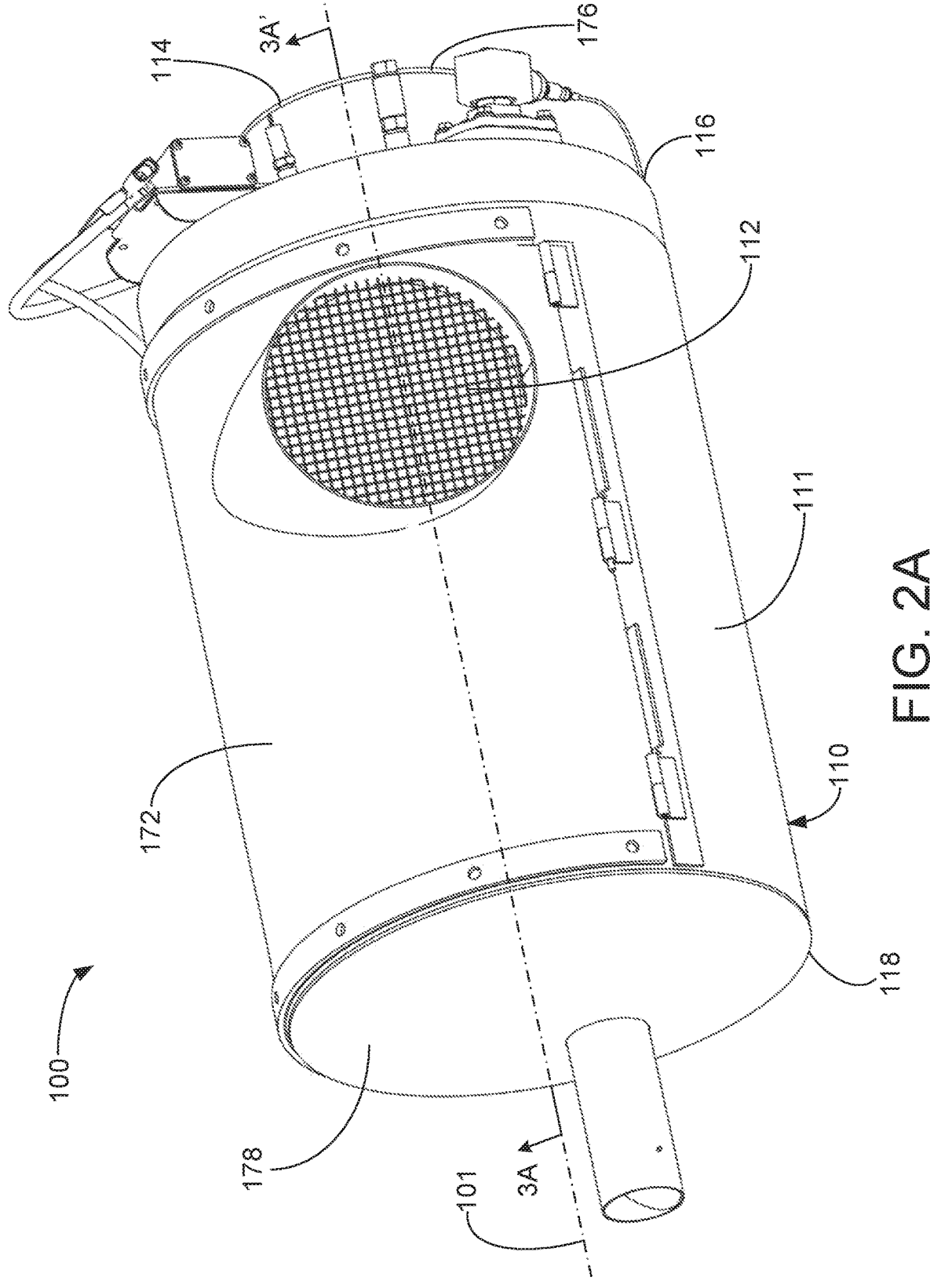
FIG. 2A is perspective view of one illustrative embodiment of an air cleaner system in a closed configuration.
Figure 2B:
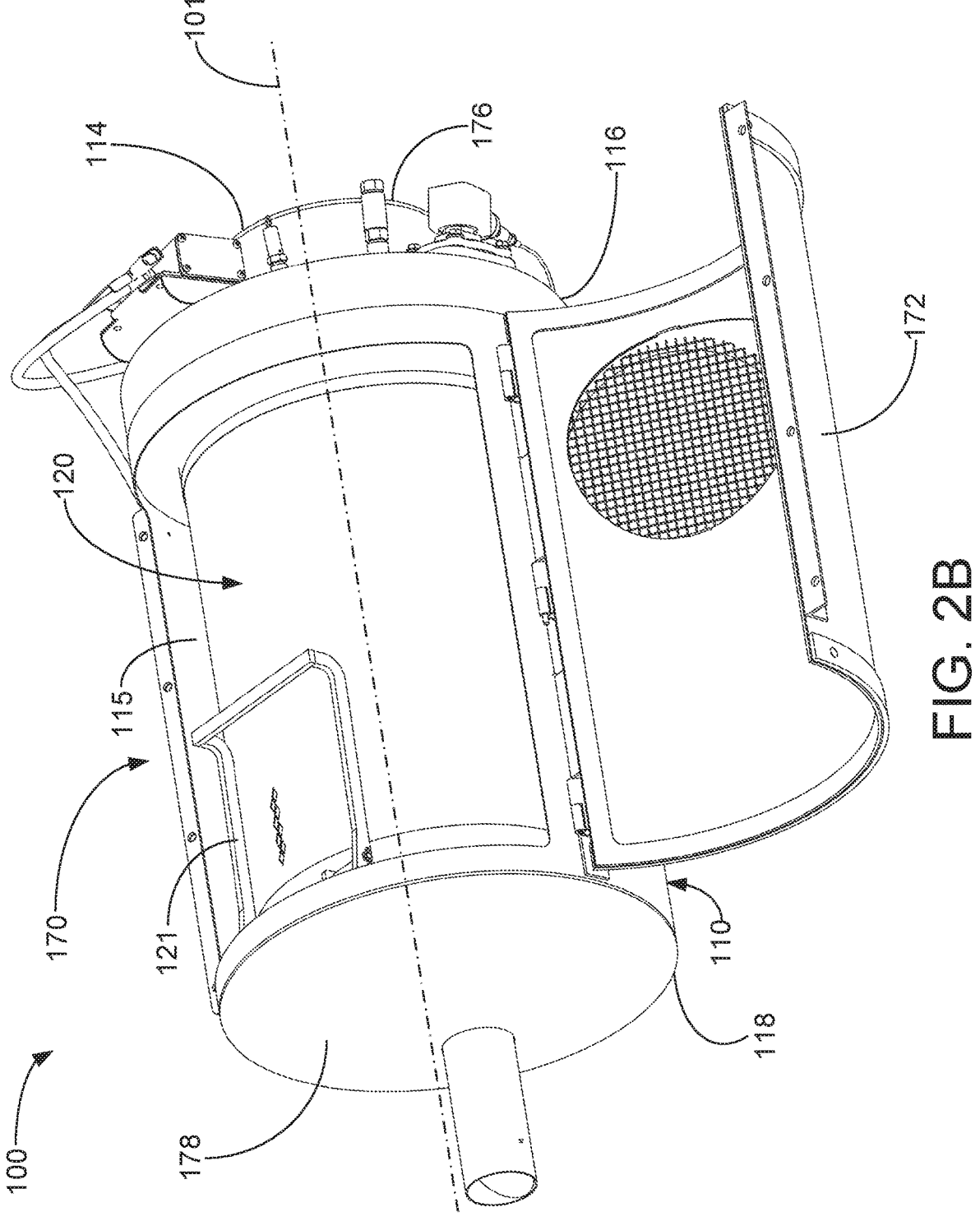
FIG. 2B is a perspective view of the air cleaner system of FIG. 2A in an open configuration.

FIG. 2A-2B depict one illustrative embodiment of an air cleaner system 100 including an air cleaner housing 110. In one or more embodiments, the air cleaner system 100 described herein may be similar to the air cleaner systems described in, e.g., U.S. Pat. No. 8,404,021 entitled "Air Cleaner Having Scavenger Arrangement," U.S. Pat. No. 5,683,479 entitled "Pulse Jet Air Cleaner System; Components; and, Methods," U.S. Pat. No. 7,927,396 entitled "Evacuation Value Arrangements; Pulse Jet Air Cleaner Systems Using Same; and, Method," and U.S. Pat. No. 9,186,612 entitled "Pulse Jet Air Cleaner Systems; Evacuation Valve Arrangements; Air Cleaner Components; and Methods."

The air cleaning housing 110 may include an air flow inlet 112 and an air flow outlet 114. The air flow inlet 112 may extend from the inlet 12 of the vehicle 10 (e.g., as shown in FIG. 1). The air flow outlet 114 may be in fluid communication with the engine intake such that filtered air passes from the air flow outlet 114 to the engine intake. The air cleaner housing 110 may also include an outer housing sidewall 111 and a filter cartridge recess 115 (e.g., as shown in FIG. 2B) located within the outer housing sidewall 111. The filter cartridge recess 115 may be positioned between the air flow inlet 112 and the air flow outlet 114 and configured to receive a filter cartridge 120.

Further, as shown in FIG. 2B, the outer housing sidewall 111 may define a housing opening 170 to provide access to the cartridge recess 115. Therefore, the housing opening 170 may be configured to allow passage of a filter cartridge 120 therethrough (e.g., to position the filter cartridge 120 within the cartridge recess 115). The air cleaner housing 110 may also include a housing access panel 172 that may be movably coupled to the outer housing sidewall 111 and configured to move between an open configuration (e.g., as shown in FIG. 2B) and a closed configuration (e.g., as shown in FIG. 2A). The housing access panel 172 may be configured to seal the housing opening 170 when the housing access panel 172 is in the closed configuration (e.g., to prevent undesired fluid communication through the housing opening 170). For example, at least one of the housing access panel 172 and the outer housing sidewall 111 may include a sealing pad (e.g., a gasket) that is configured to interface between the outer housing sidewall 111 and the housing access panel 172, when in the closed configuration, to seal the housing opening 170. Further, in one or more embodiments, the air cleaner housing 110 may include a panel latch or bolts to secure the outer housing sidewall 111 and the housing access panel 172 in the closed configuration.

The housing access panel 172 may move relative to the outer housing sidewall 111 (e.g., to move between the open and closed configurations) in any suitable way. For example, the housing access panel 172 may slide, pivot, rotate, fold, etc. Specifically, as shown, the housing access panel 172 is pivotally coupled to the outer housing sidewall 111 via hinges. Further, as shown in FIG. 2A, the housing access panel 172 may conform to a surface of the outer housing sidewall 111. For example, the housing access panel 172 may define a segment of a cylindrical shape of the outer housing sidewall 111, as illustrated in FIG. 2A. Furthermore, the housing access panel 172 and/or the housing opening 170 may extend around greater than or equal to about 40 degrees, greater than or equal to about 90 degrees, greater than or equal to about 120 degrees, greater than or equal to 150 degrees, etc. and/or less than or equal to about 270 degrees, less than or equal to 240 degrees, less than or equal to about 210 degrees, less than or equal to about 180 degrees, etc. of the outer housing sidewall 111 in a radial direction.

The outer housing sidewall 111 may extend between a first housing end 116 and a second housing end 118 along a longitudinal axis 101. The housing opening 170 may be positioned along the outer housing sidewall 111 between the first and second housing ends 116, 118. The air cleaner housing 110 may also include a first housing end cap 176 proximate the first housing end 116 and a second housing end cap 178 proximate the second housing end 118. In some embodiments, one of the first housing end cap 176 or the second housing end cap 178 may be removably couplable to the outer housing sidewall 111 such that the filter cartridge 120 may be inserted into and removed from the cartridge recess 115 through an opening created by removing the first housing end cap 176 or the second housing end cap 178.

However, as described herein, the air cleaner housing 110 may be configured such that the filter cartridge 120 may be inserted into and removed from the cartridge recess 115 through the housing opening 170, which may be, e.g., located between the first housing end cap 176 and the second housing end cap 178. For example, in one or more embodiments, the air cleaner housing 110 may be positioned within the vehicle 10 in a position that may limit access to the air cleaner housing 110 through either the first housing end 116 and/or the second housing end 118. In other words, the structure surrounding the air cleaner housing 110 may limit the space in which the first and/or second housing end cap 176, 178 may move to allow the filter cartridge 120 to be inserted into or removed from the cartridge recess 115. Therefore, the first housing end cap 176 may be fixedly coupled to the outer housing sidewall 111 and/or the second housing end cap 178 may be fixedly coupled to the outer housing sidewall 111 because the filter cartridge 120 may access the cartridge recess 115 through the housing opening 170.

Figure 3A:
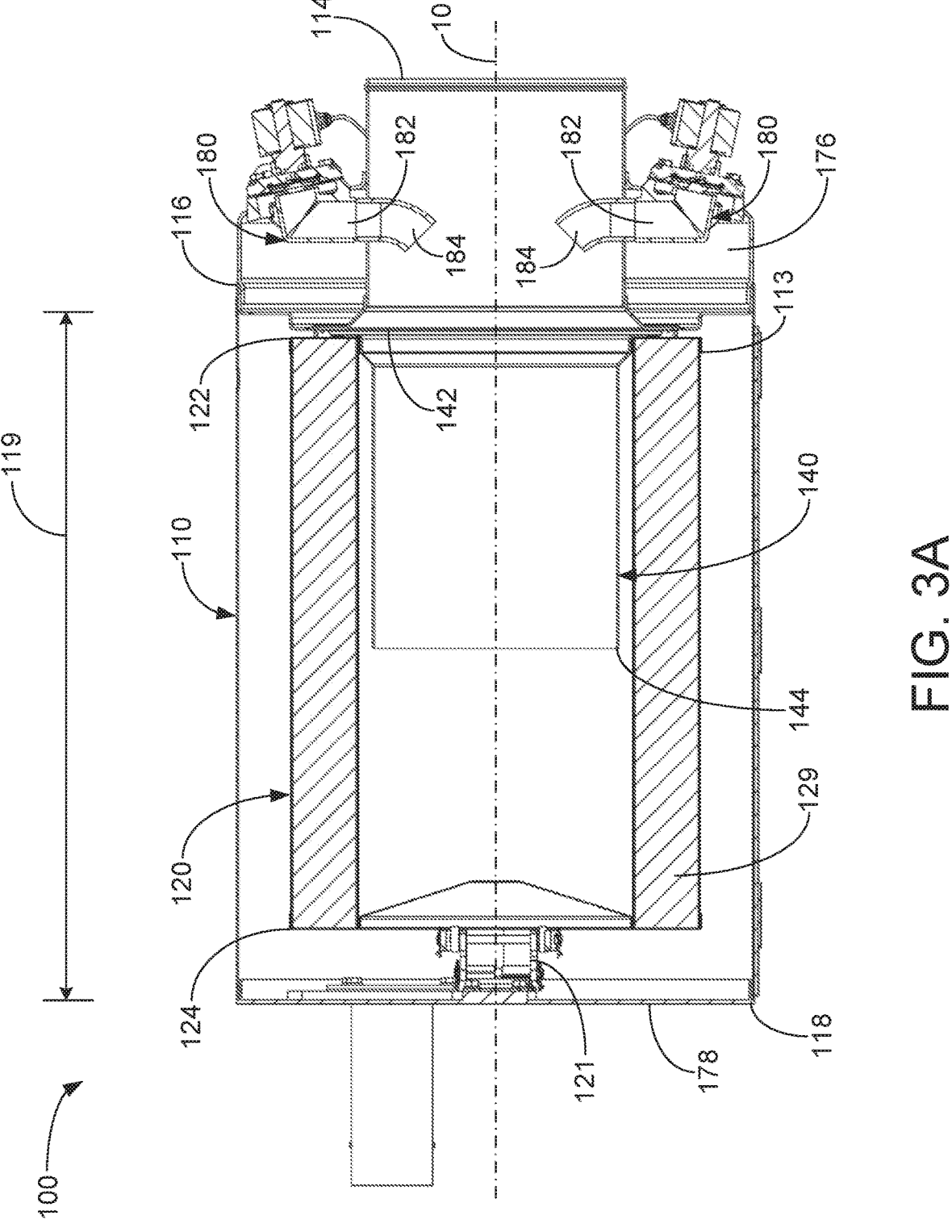
FIG. 3A is a cross-sectional view of the air cleaner system of FIG. 2A, taken across line 3A-3A' of FIG. 2A.
Figure 3B:
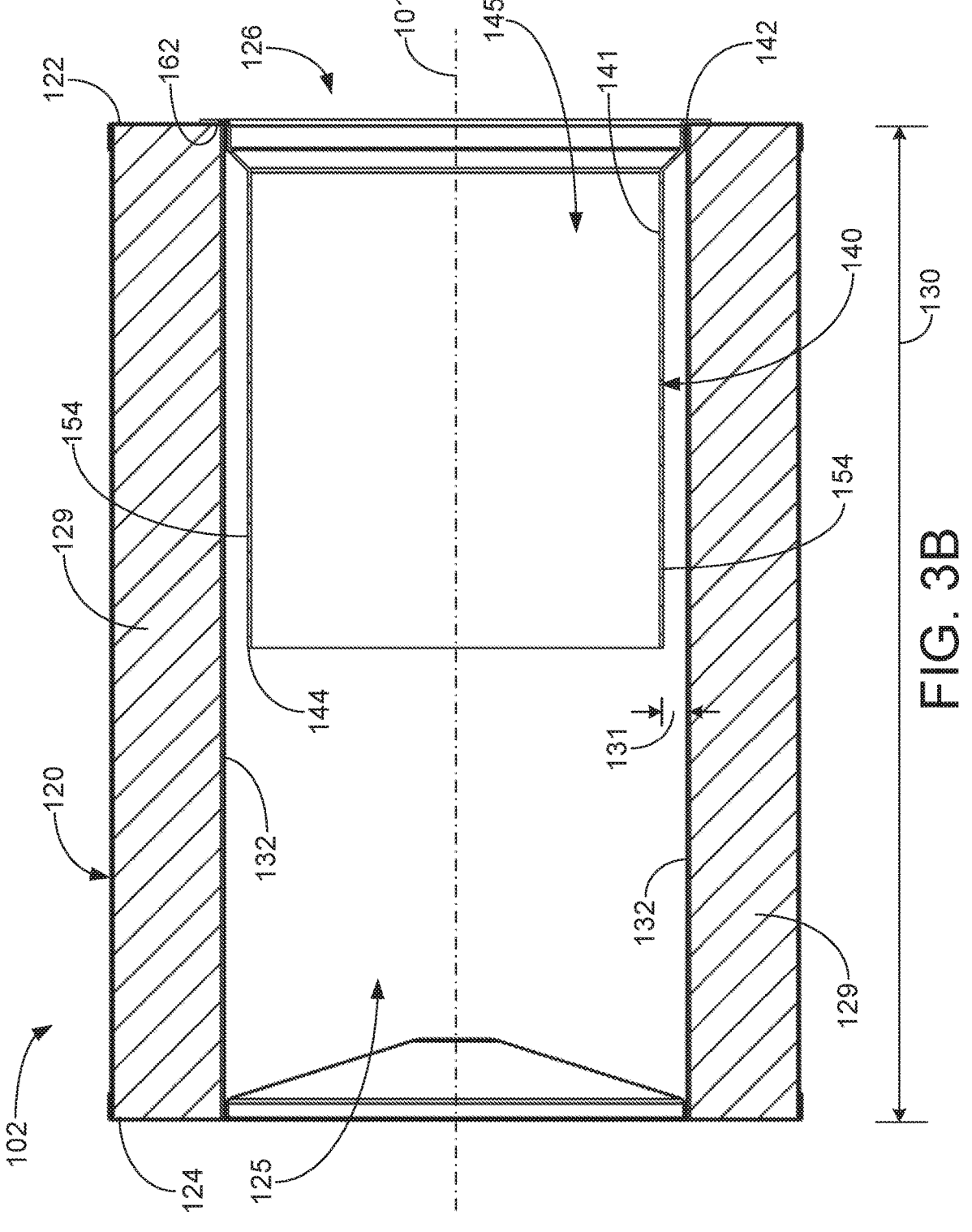
FIG. 3B is an isolated cross-sectional view of an air cleaner assembly of the air cleaner system of FIG. 3A.

Further, the outer housing sidewall 111 may define a housing length 119 (of the air cleaner housing 110) between the first housing end 116 and the second housing end 118 measured along the longitudinal axis 101, as shown in FIG. 3A. In one or more embodiments, the housing opening 170 may extend for the entirety of the housing length 119 along the longitudinal axis 101. In other embodiments, the housing opening 170 may extend for less than the housing length 119 along the longitudinal axis 101. For example, the housing opening 170 may extend along the longitudinal axis 101 by greater than or equal to about 50% of the housing length 119, greater than or equal to about 60% of the housing length 119, greater than or equal to about 70% of the housing length 119, etc. and/or less than or equal to about 100% of the housing length 119, less than or equal to about 90% of the housing length 119, less than or equal to about 80% of the housing length 119, etc. Also, in one or more embodiments, a length of the housing opening 170, measured along the longitudinal axis 101, may be greater than or equal to a cartridge length 130 (e.g., as shown in FIG. 3B). For example, cartridge length 130 may greater than or equal to about 60%, greater than or equal to about 70%, greater than or equal to about 80%, greater than or equal to about 90% of the length of the housing opening 170. Further, for example, the length of the housing opening 170 may be less than or equal to about 150%, less than or equal to about 130%, less than or equal to about 120%, less than or equal to about 110%, less than or equal to about 100% of the cartridge length 130.

Furthermore, as shown in FIG. 3A, the air cleaner system 100 may include a filter cartridge 120 located within the filter cartridge recess 115 of the air cleaner housing 110. The filter cartridge 120 may extend along a longitudinal axis 101 between a first filter end 122 and a second filter end 124. Further, the filter cartridge 120 may include filter media 129 configured to filter air passing through the filter media 129. For example, air entering the air cleaner housing 110 through the air flow inlet 112 may pass through the filter media 129 before passing out of the air cleaner housing 110 through the air flow outlet 114 (and on to the engine intake). In other words, the filter media 129 may be positioned such that air passing between the air flow inlet 112 and the air flow outlet 114 must travel through the filter media 129. In one or more embodiments, the filter cartridge 120 may define a cartridge opening 126 and a cartridge passage 125 extending within the filter cartridge 120 from the cartridge opening 126. The cartridge opening 126 may be located at either or both of the first filter end 122 and the second filter end 124. For example, as shown in FIGS. 3A-3B, the cartridge opening 126 is located at the first filter end 122. Further, in one or more embodiments, the end of the filter cartridge 120 located opposite the cartridge opening 126 may be closed or sealed. The cartridge passage 125 may be defined by an inner filter surface 132 of the filter cartridge 120.

The filter media 129 and the air cleaner housing 110 may define a clean air space within the cartridge passage 126 and, e.g., in fluid communication with the air flow outlet 114. The clean air space 120 may be described as within the filter media 129 and, therefore, may only contain air that has been filtered (e.g., due to air traveling from the air flow inlet 112 and through the filter media 129). As such, only filtered air may proceed through the air flow outlet 114 and towards the engine intake.

The filter cartridge 120 may be any suitable shape and size that forms a filter barrier between the air flow inlet 112 and the air flow outlet 114. As shown in FIG. 3A, the filter cartridge 120 represents a cross-sectional view of a cylindrical/annular filter cartridge 120. The filter cartridge used in one or more alternative embodiments of an air cleaner assembly described herein may define a filter cartridge that is, e.g., axial seal cylindrical, radial seal cylindrical, POW-ERCORE, VEE-PAC, etc. Further, the filter cartridge 120 may be positioned away from the air cleaner housing 110 such that there may be a gap between the filter cartridge 120 and the air cleaner housing 110. This gap between the filter cartridge 120 and the air cleaner housing 110 may provide a passageway for air to travel from the air flow inlet 112 and disperse over the surface area of the filter media 129 (e.g., to improve access to the filter media 129) before passing through the filter media 129 and into the clean air space.

In one or more embodiments, the filter cartridge 120 may be configured to be positioned within the filter cartridge recess 115 of the air cleaner housing 110 such that the filter cartridge 120 may axially seal with the air cleaner housing 110 (e.g., relative to the longitudinal axis 101). For example, the filter cartridge 120 may interface and seal with the air cleaner housing 110 at the first and second filter ends 122, 124. Further, in one or more embodiments, the air cleaner housing 110 may also include a latch 121 (e.g., as shown in FIGS. 2B and 3A) configured to secure the filter cartridge 120 into position within the filter cartridge recess 115 of the air cleaner housing 110. For example, the latch 121 may be positioned proximate an end of the air cleaner housing 110 (e.g., the second housing end 118) and configured to apply a force on and over center of the filter cartridge 120 to secure the filter cartridge 120 against the air cleaner hosing 110. Specifically, the latch 121 may be positionable between a latched configuration that secures the filter cartridge 120 to the air cleaner housing 110 and an open configuration that permits the filter cartridge 120 to be inserted into and removed from the filter cartridge recess 115. Further yet, in one or more embodiments, the air cleaner housing 110 may include a protrusion 113 configured to locate the filter cartridge 120 relative to the air cleaner housing 110 when the filter cartridge 120 is positioned within the filter cartridge recess 115. For example, the protrusion 113 may define a recess into which the filter cartridge 120 (e.g., the first filter end 122) may extend.

The air cleaner system 100 may also include a pulse cleaning apparatus 180 positioned between the filter media 129 and the air flow outlet 114. The pulse cleaning apparatus 180 may be configured to produce a pulse of air (or any suitable gas or gasses) within the clean air space, which applies a force on the filter media 129 from within the clean air space. The pulse cleaning apparatus 180 may define any shape and may include any configuration of components. For example, the pulse cleaning apparatus 180 may include a pulse tube 182 extending within the air cleaner housing 110 and into the clean air space. The pulse tube 182 defines a discharge outlet 184 positioned in the clean air space and facing away from the air flow outlet 114. As a result, the force from the pulse of air of the pulse cleaning apparatus 180 travels from the discharge outlet 184 to the filter media 129 to detach or separate particulate (e.g., that has accumulated on filter media 129) from the exterior surface of the filter media 129. The pulse cleaning apparatus 180 may include any suitable number of pulse jet cleaners (e.g., one, two, three, four, etc.). As shown in FIG. 3A, the pulse cleaning apparatus 180 may include two pulse tubes 182. Further, in one or more embodiments, the pulse cleaning apparatus 180 may be similar to the pulse assembly described in, e.g., U.S. Pat. No. 8,404,021 entitled "Pulse jet Air Cleaner System; Components; and, Methods."

As shown in FIG. 3A, the discharge outlet 184 of the pulse cleaning apparatus 180 may be positioned proximate the first filter end 122. Further, it may be described that the pulse cleaning apparatus 180 (e.g., the pulse tube 182 and the discharge outlet 184) may be positioned beyond the first filter end 122. In other words, the pulse cleaning apparatus 180 may not be located within the cartridge passage 125. Therefore, the filter cartridge 120 may be inserted into or removed from the filter cartridge recess 115 (e.g., in a direction that is angled relative to the longitudinal axis 101) without contacting or interacting with any portion of the pulse cleaning apparatus 180. In other words, the pulse cleaning apparatus 180 may not interfere with installation or removal of the filter cartridge 120 (e.g., when the filter cartridge 120 is moved in a direction that is at an angle (e.g., transverse, etc.) to the longitudinal axis 101).

Figure 4:
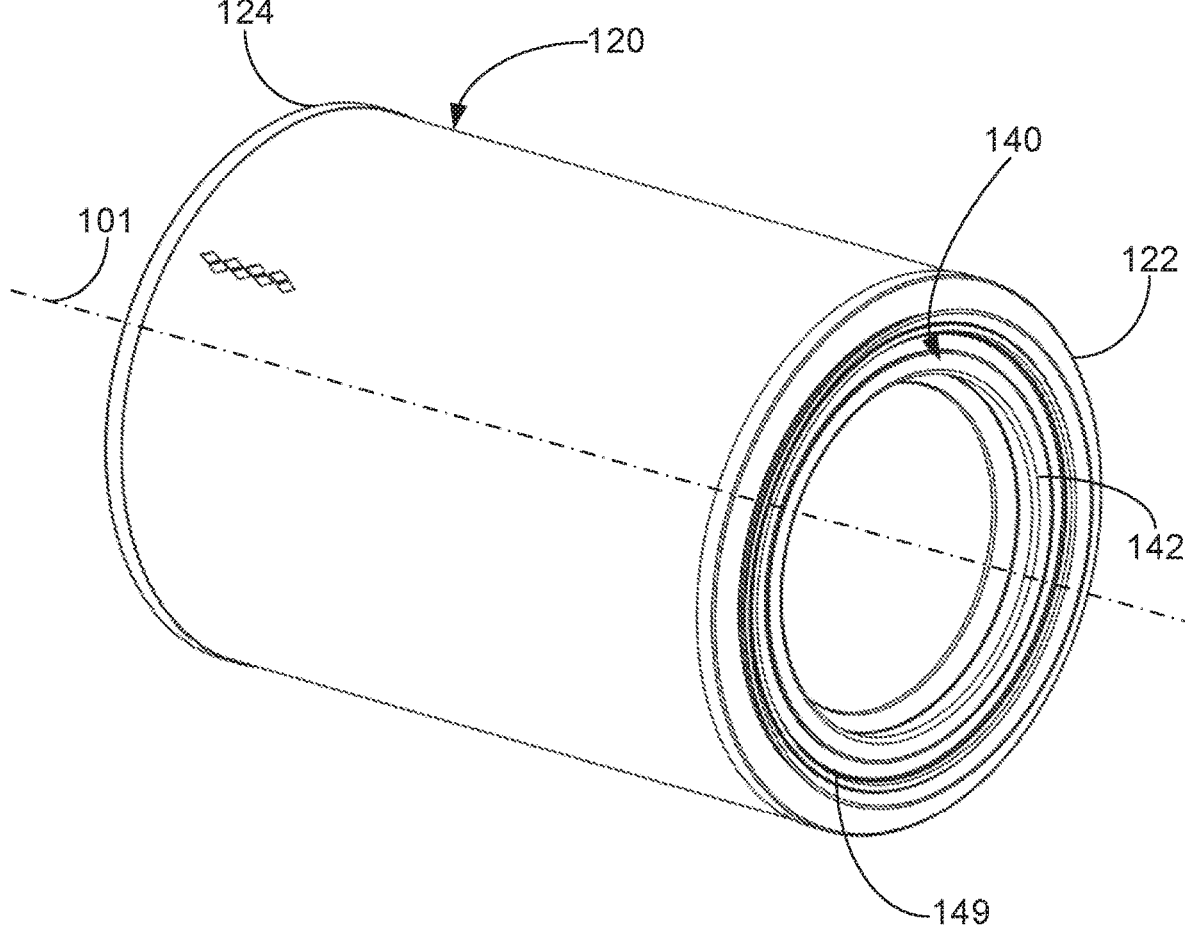
FIG. 4 is a perspective view of one illustrative embodiment of an air cleaner assembly for an air cleaner system as described herein.

An air cleaner assembly 102 of the air cleaner system 100 is illustrated in FIG. 3B. The air cleaner assembly 102 may include the filter cartridge 120 and a pulse tube extension 140. The pulse tube extension 140 may be coupled to the filter cartridge 120 and extend within the filter cartridge 120 (e.g., along the longitudinal axis 101) such that an outer tube surface 154 of the pulse tube extension 140 faces the filter cartridge 120 (e.g., the inner filter surface 132). For example, the pulse tube extension 140 may be located within the cartridge passage 125. The pulse tube extension 140 and the filter cartridge 120 may be coupled together such that the pulse tube extension 140 and the filter cartridge 120 move together. Specifically, the pulse tube extension 140 and the filter cartridge 120 may be configured to be insertable into or removable from the filter cartridge recess 115 together (e.g., because the pulse tube extension 140 is coupled to the filter cartridge 120). In one or more embodiments, the air cleaner assembly 102 may include a gasket 149 (e.g., as shown in FIG. 4) positioned between the pulse tube extension 140 and the filter cartridge 120 at the location for which they are coupled together to prevent undesirable fluid flow therebetween.

Furthermore, the pulse tube extension 140 may include a tube sidewall 141 extending between a first tube end 142 and a second tube end 144. Further, the tube sidewall 141 of the pulse tube extension 140 may define a tube passage 145 extending through the pulse tube extension 140 between the first and second tube ends 142, 144. In other words, the pulse tube extension 140 may be described as defining an annular shape due to the tube sidewall 141 and the tube passage 145 extending therethrough. Further yet, the pulse tube extension 140 may be positioned such that the tube passage 145 may be located within the cartridge passage 125. In one or more embodiments, it may be described that the pulse cleaning apparatus is located beyond the first tube end 142 and not within the tube passage 145 (e.g., when the pulse tube extension 140 is positioned in the filter cartridge recess 115).

The pulse tube extension 140 may be configured to allow gas from the pulse cleaning apparatus 180 (e.g., within the tube passage 145) to disperse evenly before exiting the pulse tube extension 140 (e.g., to form a laminar pulse flow from the pulse cleaning apparatus 180). In other words, the pulse tube extension 140 may be dimensioned (e.g., length and diameter) such that gas exiting the pulse cleaning apparatus 180 (e.g., the discharge outlet 184) expands to the diameter of the pulse tube extension 140 by the time the gas reaches the end (e.g., the second tube end 144) of the pulse tube extension 140. Therefore, gas from the pulse cleaning apparatus 180 may be uniformly dispersed such that the gas may be more effectively delivered to pulse the filter media 129 to remove sediment or debris from the exterior surface of the filter media 129.

In one or more embodiments, the pulse tube extension 140 may be fixedly coupled or integral with the filter cartridge 120. In other words, the filter cartridge 120 may be manufactured (e.g., fixedly coupled or integral) such that that pulse tube extension 140 is permanently attached to the filter cartridge 120. For example, the pulse tube extension 140 may be permanently attached to the filter cartridge 120 such that they cannot be removed from one another without irreparably damaging at least one of the pulse tube extension 140 and the filter cartridge 120 and/or materials, bonds, etc. used to fixedly attach the pulse tube extension 140 to the filter cartridge 120. When the filter cartridge 120 is permanently attached to the pulse tube extension 140, if the filter cartridge 120 is replaced in the air cleaner housing 110, the pulse tube extension 140 is also replaced (e.g., because they are fixedly coupled to one another). The pulse tube extension 140 may be fixedly coupled to the filter cartridge 120 in any suitable way. For example, the pulse tube extension 140 may be fixedly coupled to the filter cartridge 120 by adhesive, welding (e.g., thermal, sonic, chemical, etc.), interference or press fit, or any combination thereof, etc.

Fixedly coupling pulse tube extensions in the filter cartridges described herein may be advantageous as compared to removably coupling the pulse tube extensions for one or more reasons. For example, fixedly coupling a pulse tube extension in a filter cartridge ensures that the pulse tube extension is present as the filter cartridge is installed (i.e., the installer cannot forget to insert a pulse tube extension into the filter cartridge before installing the filter cartridge in an air cleaner housing), proper sizing of the pulse tube extension for a filter cartridge is ensured, proper placement of the pulse tube extension in the filter cartridge is ensured, maintaining the position of the pulse tube extension relative to the filter cartridge after installation of the filter cartridge in an air cleaner housing is ensured, etc.

In other embodiments, the pulse tube extension 140 may be removably couplable to the filter cartridge 120. Therefore, after removal of the filter cartridge 120 (and the pulse tube extension 140 coupled thereto) from the air cleaner housing 110, the pulse tube extension 140 may be removed from the filter cartridge 120 and placed within a different filter cartridge and, thereafter, placed within the air cleaner housing 110.

The air cleaner system 100 may be configured such that the filter cartridge 120 and the pulse tube extension 140 may be inserted into and removed from the filter cartridge recess 115 of the air cleaner housing 110 in a direction at least partially transverse to the longitudinal axis 101. For example, the filter cartridge 120 and the pulse tube extension 140 may move through the house opening 170 (e.g., defined in the outer housing sidewall 111) to be installed or removed from the air cleaner housing 110. In typical air cleaner systems, a pulse tube extension may be fixedly coupled to an air cleaner housing, which would prevent a filter cartridge from being inserted into or removed from the air cleaner housing at an angle that is at least partially transverse to the longitudinal axis (e.g., because the pulse tube extension would prevent or block the filter cartridge from moving in that direction). In such configurations, the filter cartridge would typically be inserted into and removed from the air cleaner housing in an axial direction (e.g., along the longitudinal axis). By coupling the pulse tube extension 140 and the filter cartridge 120, the pulse tube extension 140 does not interfere with movement of the filter cartridge 120 when moving in a direction that is not parallel to or along the longitudinal axis 101. Further, other components of the air cleaner housing 110 may not interfere with insertion or removal of the filter cartridge 120 with the pulse tube extension 140 therein.

As shown in FIGS. 3B and 4, the first tube end 142 of the pulse tube extension 140 may be coupled to the first filter end 122 of the filter cartridge 120. Specifically, the pulse tube extension 140 may directly contact the first filter end 122 of the filter cartridge 120. Also, the pulse tube extension 140 may extend into the cartridge passage 125 towards the second filter end 124 of the filter cartridge 120. Further, as shown in FIG. 3B, the filter cartridge 120 may define a cartridge length 130 between the first filter end 122 and the second filter end 124, measured along the longitudinal axis 101. The pulse tube extension 140 may extend within the filter cartridge 120 for greater than or equal to 40%, greater than or equal to 50%, greater than or equal to 60%, and/or less than or equal to 90%, less than or equal to 80%, less than or equal to 70% of the cartridge length 130. In one or more embodiments, the pulse tube extension 140 may be positioned such that an end (e.g., the first tube end 142) may be flush with an end (e.g., the first filter end 122) of the filter cartridge 120. In other embodiments, the pulse tube extension 140 may extend past an end (e.g., the first filter end 122) of the filter cartridge 120 (e.g., in a direction opposite the cartridge passage 125). Specifically, the pulse tube extension 140 may extend past the first filter end 122 by less than or equal to 2.5 centimeters (e.g., 1 inch), less than or equal to 6 centimeters (e.g., 2.25 inches), less than or equal to 8 centimeters (e.g., 3 inches), etc. Also, for example, the pulse tube extension 140 may extend past the first filter end 122 by less than or equal to 20%, less than or equal to 10%, less than or equal to 5% of the length of the pulse tube extension 140.

Additionally, the tube sidewall 141 may extend along (e.g., be concentric to) the inner filter surface 132 of the filter cartridge 120 for a length of the tube sidewall 141, measured along the longitudinal axis 101. For example, a majority of the pulse tube extension 140 may be shaped such that the tube sidewall 141 coextends with the filter media 129. Specifically, at least a portion of the tube sidewall 141 may be spaced a gap distance 131 away from the filter media 129. More specifically, the gap distance 131 may be measured between the inner filter surface 132 and the outer tube surface 154 of the pulse tube extension 140. The gap distance 131 may be greater than or equal to 0.6 centimeters (e.g., 0.25 inches), greater than or equal to 1.2 centimeters (e.g., 0.5 inches), etc. and/or less than or equal to 2.5 centimeters (e.g., 1 inch), less than or equal to 2 centimeters (e.g., 0.75 inches), etc. The gap between the filter cartridge 120 and the pulse tube extension 140 may allow for the access of air dispersed therethrough (e.g., air being filtered through the filter media 129, pulses of gas from the pulse cleaning apparatus 180, etc.).

Figure 5A:
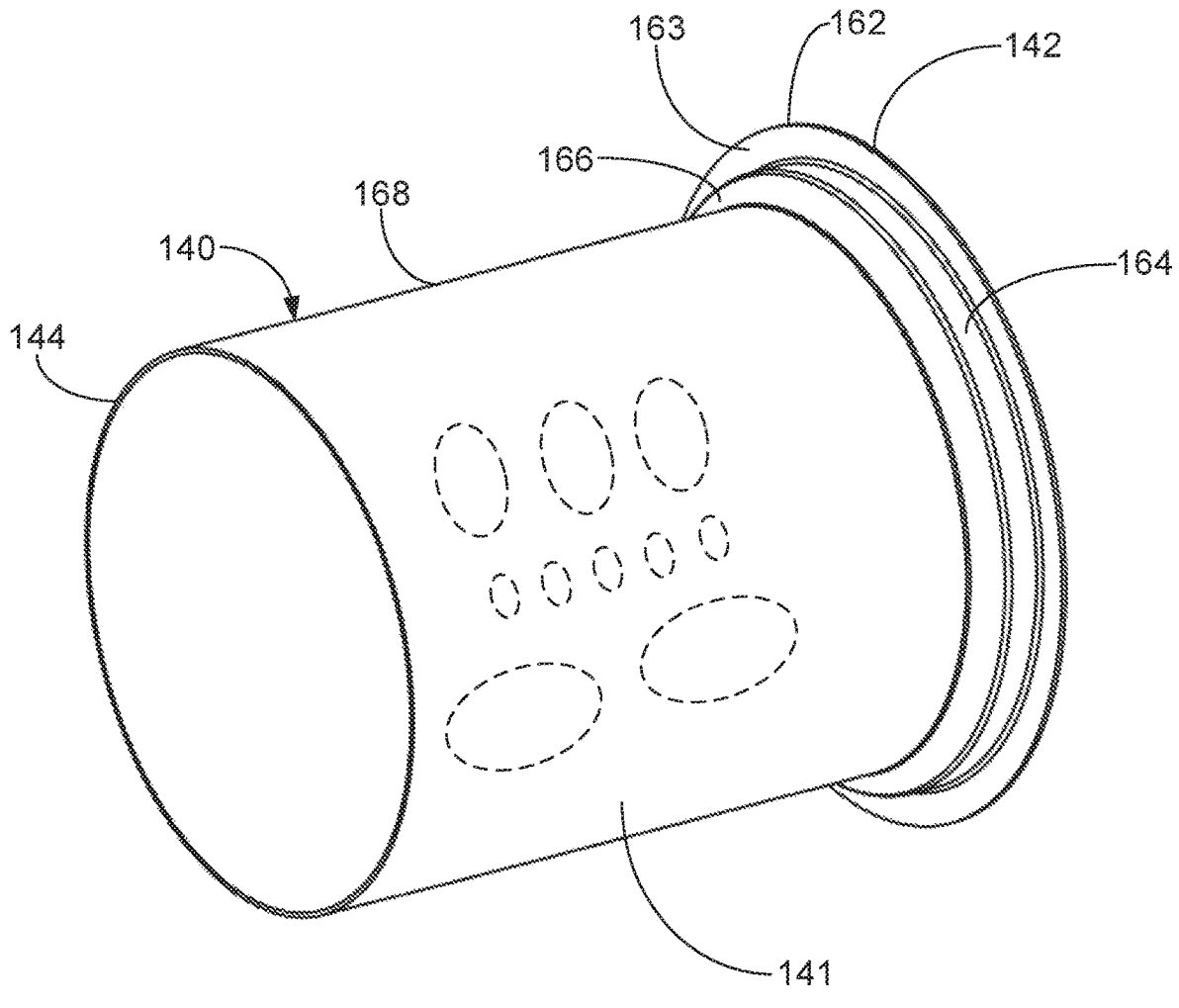
FIG. 5A is a perspective view of one illustrative embodiment of a pulse tube extension.
Figure 5B:
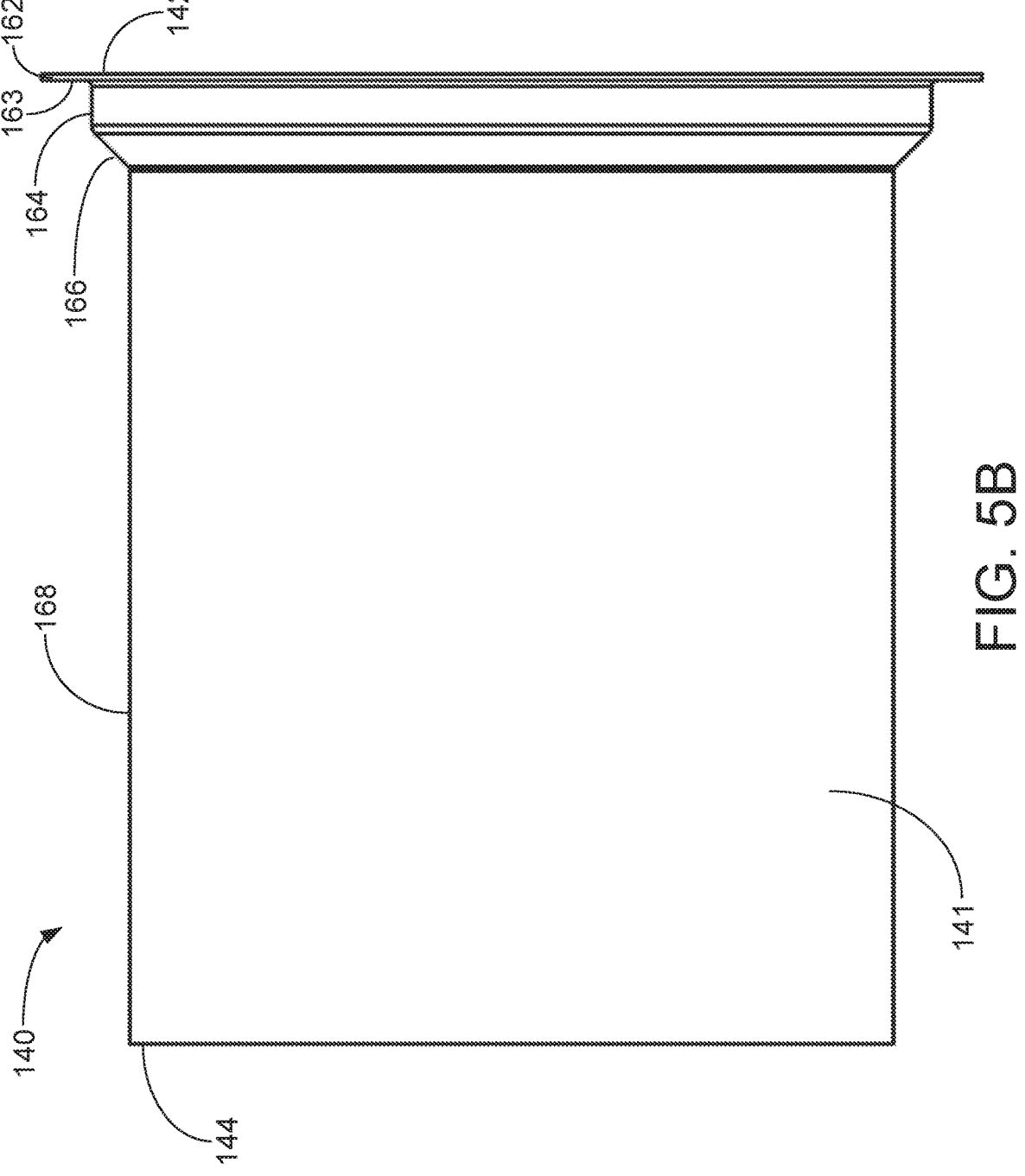
FIG. 5B is a side plan view of the pulse tube extension of FIG. 5A.

The tube sidewall 141 of the pulse tube extension 140 may include various portions along the length of the pulse tube extension 140 as shown in FIGS. 5A-5B. For example, the pulse tube extension 140 may include a tube flange portion 162 at the first tube end 142. An inner surface 163 of the tube flange portion 162 may by coupled to (e.g., using adhesives) the first filter end 122 of the filter cartridge 120 when the pulse tube extension 140 is coupled to the filter cartridge 120. In one or more embodiments, the inner surface 163 of the tube flange portion 162 may directly contact the first filter end 122. As a result, the tube flange portion 162 may axially locate (e.g., along the longitudinal axis 101) the pulse tube extension 140 relative to the filter cartridge 120.

The pulse tube extension 140 may also include a tube contact portion 164 adjacent the tube flange portion 162. In or more embodiments, the tube contact portion 164 may contact the inner filter surface 132 of the filter cartridge 120 when the pulse tube extension 140 is coupled to the filter cartridge 120. Further, the tube contact portion 164 may contact the filter cartridge 120 around the perimeter of the tube contact portion 164 to center the pulse tube extension 140 within the cartridge passage 125. The pulse tube extension 140 may further include a tube extended portion 168 extending from the second tube end 144. The tube extended portion 168 may be the portion of the pulse tube extension 140 that coextends with the inner filter surface 132 to define the gap distance 131. Further, the tube extended portion 168 may be concentric to the inner filter surface 132 along the longitudinal axis 101. Finally, the pulse tube extension 140 may include a tube taper portion 166 extending between the tube contact portion 164 and the tube extended portion 168. The tube taper portion 166 may help to define the gap distance 131 by transitioning the pulse tube extension 140 between a larger diameter (e.g., at the tube contact portion 164) and a smaller diameter (e.g., at the tube extended portion 168).

The pulse tube extension 140 may be constructed of any suitable material or materials. For example, the pulse tube extension 140 may include (e.g., be formed of) one or more materials such as, e.g., steel, aluminum, plastic, etc. Further, the pulse tube extension 140 may include an entirely solid material (e.g., no openings in the tube sidewall 141 other than the openings at the first and second tube ends 142, 144). In other embodiments, the tube sidewall 141 may define apertures (e.g., illustrated in broken lines in FIG. 5A) through which fluid may pass. The apertures defined in the tube sidewall 141 may have any suitable shape, dimensions, and quantity. In one or more embodiments, the pulse tube extension 140 (e.g., the tube sidewall 141) may be configured to control passage of gas (e.g., from the pulse cleaning apparatus 180) such that a majority of gas entering the tube passage 145 of the pulse tube extension 140 through the first tube end 142 exits the tube passage 145 through the second tube end 144.

In the preceding description, reference is made to the accompanying set of drawings that form a part hereof and in which are shown by way of illustration several specific embodiments. It is to be understood that other embodiments are contemplated and may be made without departing from (e.g., still falling within) the scope of the present disclosure. The preceding detailed description, therefore, is not to be taken in a limiting sense. All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open-ended sense, and generally mean "including, but not limited to". It will be understood that "consisting essentially of", "consisting of", and the like are subsumed in "comprising," and the like.

It is noted that terms such as "top", "bottom", "above", "below", etc. may be used in this disclosure. These terms should not be construed as limiting the position or orientation of a structure, but should be used as providing spatial relationship between the structures.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed:

1. An air cleaner system comprising:

an air cleaner housing comprising an air flow inlet and an air flow outlet, wherein the air cleaner housing comprises an outer housing sidewall and a filter cartridge recess located within the outer housing sidewall between the air flow inlet and the air flow outlet;

a filter cartridge located within the filter cartridge recess, wherein the filter cartridge extends along a longitudinal axis between a first filter end and a second filter end and comprises filter media configured to filter air passing through the filter media, and wherein air entering the air cleaner housing through the air flow inlet passes through the filter media before passing out of the air cleaner housing through the air flow outlet, and wherein the filter cartridge is configured to be positioned within the filter cartridge recess of the air cleaner housing such that the filter cartridge forms a first axial seal with the air cleaner housing at the first filter end and the filter cartridge forms a second axial seal with the air cleaner housing at the second filter end; and a pulse tube extension coupled to the filter cartridge and extending into the filter cartridge such that an outer tube surface of the pulse tube extension faces the filter cartridge, wherein the pulse tube extension comprises a tube flange portion at a first tube end, wherein an inner surface of the tube flange portion directly contacts the first filter end of the filter cartridge, wherein the filter cartridge and the pulse tube extension are configured to be inserted into and removed from the filter cartridge recess of the air cleaner housing in a direction at least partially transverse to the longitudinal axis, wherein the pulse tube extension comprises a pulse inlet that contacts the filter cartridge at the first filter end to form a pulse tube extension seal about a perimeter of the pulse tube extension at the first filter end to avoid air bypass between the air flow inlet and an interior of the pulse tube extension, wherein the outer housing sidewall defines a housing opening configured to allow passage of the filter cartridge and pulse tube extension therethrough.

2. The system of claim 1, wherein the pulse tube extension is fixedly coupled to the filter cartridge.

3. The system of claim 1, wherein the air cleaner housing further comprises a housing access panel movably coupled to the outer housing sidewall and configured to move between an open configuration and a closed configuration, wherein the housing opening is sealed when the housing access panel is in the closed configuration.

4. The system of claim 1, wherein the outer housing sidewall defines a housing length between a first housing end and a second housing end measured along the longitudinal axis, wherein the housing opening extends along the longitudinal axis 40% to 90% of the housing length.

5. The system of claim 1, wherein the outer housing sidewall extends between a first housing end and a second housing end along the longitudinal axis, wherein the air cleaner housing comprises a first housing end cap proximate the first housing end and a second housing end cap proximate the second housing end, wherein the first and second housing end caps are fixedly coupled to the outer housing sidewall.

6. The system of claim 1, wherein the air cleaner housing further comprises a latch configured to secure the filter cartridge into position within the filter cartridge recess of the air cleaner housing.

7. The system of claim 1, wherein the air cleaner housing further comprises a recess/protrusion configured to locate the filter cartridge relative to the air cleaner housing when the filter cartridge is positioned within the filter cartridge recess.

8. The system of claim 1, wherein the pulse tube extension seal comprises an axial seal.

9. The system of claim 1, wherein the outer tube surface of the pulse extension tube is spaced apart from an inner filter surface of the filter cartridge.

10. The system of claim 9, wherein the outer tube surface of the pulse extension tube is spaced apart a distance of at least 0.6 centimeters from the inner filter surface of the filter cartridge.

11. The system of claim 1, wherein the filter cartridge defines a cartridge length between the first filter end and the second filter end measured along the longitudinal axis, and wherein the pulse tube extension extends within the filter cartridge for at least 40% of the cartridge length.

12. The system of claim 1, wherein the outer tube surface of the pulse extension tube is concentric to an inner filter surface of the filter cartridge for a length measured along the longitudinal axis.

13. The system of claim 1, wherein the pulse tube extension comprises:

a tube contact portion adjacent the tube flange portion and in contact with an inner filter surface of the filter cartridge, and a tube extended portion at a second tube end.

14. The system of claim 1, wherein the pulse extension tube includes a tube sidewall defining a tube passageway, wherein the tube passageway is located within a filter passageway defined by the filter cartridge, and wherein the tube sidewall of the pulse extension tube defines apertures.

15. The system of claim 1, wherein the pulse tube extension includes a tube sidewall defining a tube passageway, wherein the tube passageway is located within a cartridge passageway defined by the filter cartridge, and wherein the tube sidewall is concentric to an inner filter surface of the filter cartridge for a length measured along the longitudinal axis.

16. The system of claim 13, wherein the pulse tube extension further comprises a tube tapered portion extending between the tube contact portion and the tube extended portion.

17. The system of claim 13, wherein the tube contact portion is configured to center the pulse tube extension within a cartridge passage defined by the filter cartridge.

18. An air cleaner system comprising:

an air cleaner housing comprising an air flow inlet and an air flow outlet, wherein the air cleaner housing comprises an outer housing sidewall and a filter cartridge recess located within the outer housing sidewall between the air flow inlet and the air flow outlet;

a filter cartridge extending along a longitudinal axis between a first filter end and a second filter end, wherein the filter cartridge is positioned within the filter cartridge recess of the air cleaner housing, wherein the filter cartridge comprises filter media configured to filter air passing through the filter media such that air entering the air cleaner housing from the air flow inlet passes through the filter media before passing out of the air cleaner housing through the air flow outlet, the filter media defining a clean air space in fluid communication with the air flow outlet, and wherein the filter cartridge is configured to be positioned within the filter cartridge recess of the air cleaner housing such that the filter cartridge forms a first axial seal with the air cleaner housing at the first filter end and the filter cartridge forms a second axial seal with the air cleaner housing at the second filter end;

a pulse tube extension coupled to the filter cartridge and extending into the filter cartridge such that an outer tube surface of the pulse tube extension faces the filter cartridge, wherein the pulse tube extension comprises a tube flange portion at a first tube end, wherein an inner surface of the tube flange portion directly contacts the first filter end of the filter cartridge, wherein the filter cartridge and the pulse tube extension are configured to be insertable and removable from the filter cartridge recess of the air cleaner housing in a direction at least partially transverse to the longitudinal axis, wherein the pulse tube extension comprises a pulse inlet that contacts the filter cartridge at the first filter end to form a pulse tube extension seal about a perimeter of the pulse tube extension at the first filter end to avoid air bypass between the air flow inlet and an interior of the pulse tube extension; and a pulse cleaning apparatus positioned between the filter media and the air flow outlet, wherein the pulse cleaning apparatus is configured to direct gas through the clean air space and towards the filter media, wherein the outer housing sidewall defines a housing opening configured to allow passage of the filter cartridge and pulse tube extension therethrough.

19. The system of claim 18, wherein a discharge outlet of the pulse cleaning apparatus is positioned proximate the first filter end.

20. The system of claim 18, wherein a discharge outlet of the pulse cleaning apparatus is positioned beyond the first tube end and the first filter end.

21. The system of claim 18, wherein the air cleaner housing further comprises a housing access panel movably coupled to the outer housing sidewall and configured to move between an open configuration and a closed configuration, wherein the housing opening is sealed when the housing access panel is in the closed configuration.

22. The system of claim 18, wherein the outer housing sidewall defines housing length between a first housing end and a second housing end measured along the longitudinal axis, wherein the housing opening extends along the longitudinal axis 40% to 90% of the housing length.

23. The system of claim 18, wherein the outer housing sidewall extends between a first housing end and a second housing end along the longitudinal axis, wherein the air cleaner housing comprises a first housing end cap proximate the first housing end and a second housing end cap proximate the second housing end, wherein the first and second housing end caps are fixedly coupled to the outer housing sidewall.

24. The system of claim 18, wherein the air cleaner housing further comprises a latch configured to secure the filter cartridge into position within the filter cartridge recess of the air cleaner housing.

25. The system of claim 18, wherein the air cleaner housing further comprises a recess/protrusion configured to locate the filter cartridge relative to the air cleaner housing when the filter cartridge is positioned within the filter cartridge recess.

26. The system of claim 18, wherein the pulse tube extension is fixedly coupled to the filter cartridge.

27. The system of claim 18, wherein the outer tube surface of the pulse extension tube is spaced apart from an inner filter surface of the filter cartridge.

28. The system of claim 27, wherein the outer tube surface of the pulse extension tube is spaced apart a distance of at least 0.6 centimeters from the inner filter surface of the filter cartridge.

29. The system of claim 18, wherein the filter cartridge defines a cartridge length between the first filter end and the second filter end measured along the longitudinal axis, and wherein the pulse tube extension extends within the filter cartridge for at least 40% of the cartridge length.

30. The system of claim 18, wherein the outer tube surface of the pulse extension tube is concentric to an inner filter surface of the filter cartridge for a length measured along the longitudinal axis.

31. The system of claim 18, wherein the pulse tube extension comprises:

a tube contact portion adjacent the tube flange portion and in contact with an inner filter surface of the filter cartridge, and a tube extended portion at a second tube end.

32. The system of claim 18, wherein the pulse extension tube includes a tube sidewall defining a tube passageway, wherein the tube passageway is located within a filter passageway defined by the filter cartridge, and wherein the tube sidewall of the pulse extension tube defines apertures.

* * * * *